US012682628B2

(12) United States Patent
Kuo et al.

(10) Patent No.: US 12,682,628 B2
(45) Date of Patent: Jul. 14, 2026

(54) METHODS AND APPARATUS LOCALIZING OBJECT(S) IN VISION DATA

(71) Applicant: GOOGLE LLC, Mountain View, CA (US)

(72) Inventors: Weicheng Kuo, Oakland, CA (US); Tsung-Yi Lin, Sunnyvale, CA (US); Anelia Angelova, Sunnyvale, CA (US); Dahun Kim, Guseong-dong (KR)

(73) Assignee: GOOGLE LLC, Mountain View, CA (US)

( * ) Notice: Subject to any disclaimer, the term of this patent is extended or adjusted under 35 U.S.C. 154(b) by 197 days.

(21) Appl. No.: 18/289,725

(22) PCT Filed: Aug. 6, 2021

(86) PCT No.: PCT/US2021/044970
§ 371 (c)(1),
(2) Date: Nov. 6, 2023

(87) PCT Pub. No.: WO2022/265661
PCT Pub. Date: Dec. 22, 2022

(65) Prior Publication Data
US 2024/0257510 A1 Aug. 1, 2024

Related U.S. Application Data

(60) Provisional application No. 63/212,426, filed on Jun. 18, 2021.

(51) Int. Cl.
*G06V 10/82* (2022.01)
*G06V 10/44* (2022.01)
(Continued)

(52) U.S. Cl.
CPC .............. *G06V 10/82* (2022.01); *G06V 10/44* (2022.01); *G06V 10/774* (2022.01); *G06V 10/776* (2022.01); *G06V 20/00* (2022.01)

(58) Field of Classification Search
CPC ...... G06V 10/82; G06V 10/44; G06V 10/774; G06V 10/776; G06V 20/00; G06V 10/454;
(Continued)

(56) References Cited

U.S. PATENT DOCUMENTS 10,713,794 B1 7/2020 He et al.
2019/0025848 A1* 1/2019 Kolouri ................ G05D 1/0246

OTHER PUBLICATIONS

European Patent Office; International Search Report and Written Opinion issued in Application No. PCT/US2021/044970; 21 pages; dated May 10, 2022.
(Continued)

*Primary Examiner* — Charlotte M Baker
(74) *Attorney, Agent, or Firm* — Gray Ice Higdon

(57) ABSTRACT

An object localization network (OLN) can be used to localize object(s) (e.g., known and/or unknown object(s)) in an instance of vision data. Various implementations include detecting the localized object(s) based on the localization. Many implementations include processing the instance of vision data using the OLN to generate a objectness score (e.g., a centerness score) as well as an intersection of union (IoU) score for one or more proposed object locations in the instance of vision data. Object(s) can be localized in the instance of vision data based on the objectness scores and the IoU scores.

13 Claims, 7 Drawing Sheets

(51) Int. Cl.
　　*G06V 10/774*　　　　(2022.01)
　　*G06V 10/776*　　　　(2022.01)
　　*G06V 20/00*　　　　 (2022.01)
(58) Field of Classification Search
　　CPC .... G06F 18/217; G06N 3/045; G06N 3/0464;
　　　　　　　　　　　　　　　G06N 3/08; G06N 3/09
　　USPC ......................................................... 382/156
　　See application file for complete search history.

(56)　　　　　　　　References Cited

OTHER PUBLICATIONS

Feng, L. et al., "Robust Nucleus Detection with Partially Labeled Exemplars;" ArXiv.org, Cornell University, arXiv:1907.09738; 10 pages; dated Apr. 23, 2019.

European Patent Office; Invitation to Pay Additional Fees issued in Application No. PCT/US2021/044970; 13 pages; dated Mar. 10, 2022.

Girshick, R. B.; Fast r-cnn; IEEE International Conference on Computer Vision (ICCV); pp. 1440-1448; dated 2015.

Girshick et al. "Rich Feature Hierarchies for Accurate Object Detection and Semantic Segmentation." In Proceedings of the IEEE Conference on Computer Vision and Pattern Recognition, pp. 580-587. 2014.

He, K. et al., "Mask R-CNN;" Proceedings of the IEEE Conference on Computer Vision (ICCV); pp. 2961-2969; 2017.

He, K. et al., "Deep Residual Learning for Image Recognition;" Proceedings of the IEEE Conference on Computer Vision and Patter Recognition (CVPR); pp. 770-778, 2016.

Lin, T-Y. et al., "Feature Pyramid Networks for Object Detection;" In Proceedings of the IEEE Conference on Computer Vision and Pattern Recognition (CVPR); pp. 2117-2125; 2017.

Lin, T et al., "Focal Loss for Dense Object Detection;" In International Conference on Computer Vision; 9 pages; dated 2017.

Lin, T-Y. et al., "Microsoft COCO: Common Objects in Context;". In David Fleet et al. (Eds.): ECCV, Part V, LNCS 8693; pp. 740-755; 2014.

Liu, S. et al., "SSD: Single Shot Multibox Detector;" In European Conference on Computer Vision; 17 pages; 2016.

Redmon, J., et al.; You only look once: Unified, real-time object detection; IEEE Conference on Computer Vision and Pattern Recognition (CVPR); pp. 779-788; dated 2016.

Ren, S., et al.; Faster R-CNN: Towards Real-Time Object Detection with Region Proposal Networks; Advances in Neural Information Processing Systems; p. 1-9; dated 2015.

Uijlings, J.R.R. et al., "Selective Search for Object Recognition;" International Journal of Computer Vision (IJCV); 18 pages; 2013.

Arbelaez, P. et al., "Multiscale Combinatorial Grouping"; In Proceedings of the IEEE Conference on Computer Vision and Pattern Recognition; 8 pages; dated 2014.

Bendale, A. et al., "Towards Open Set Deep Networks"; In Proceedings of the IEEE Conference on Computer Vision and Pattern Recognition; pp. 1563-1572; dated 2016.

Damen, D. et al., "The Epic-Kitchens Dataset: Collection, Challenges and Baselines"; IEEE Transactions on Pattern Analysis and Machine Intelligence (TPAMI); pp. 4125-4141; dated 2020.

Dasari, S. et al., "RoboNet: Large-Scale Multi-Robot Learning";. arXiv.org; arXiv:1910.11215v1; 13 pages; dated Oct. 24, 2019.

Dhamija, A.R., et al., "The Overlooked Elephant of Object Detection: Open Set"; In The IEEE Winter Conference on Applications of Computer Vision; pp. 1021-1030; dated 2020.

Duan, K. et al., "CenterNet: Keypoint Triplets for Object Detection"; In Proceedings of the IEEE International Conference on Computer Vision; pp. 6569-6578; dated 2019.

Fouhey, D.F. et al., "From Lifestyle Vlogs to Everyday Interactions"; In CVPR; pp. 4991-5000; dated 2018.

Gupta, A. et al., "LVIS: A Dataset for Large Vocabulary Instance Segmentation"; In Proceedings of the IEEE Conference on Computer Vision and Pattern Recognition; pp. 5356-5364; dated 2019.

Huang, Z. et al., "Mask Scoring R-CNN"; In Proceedings of the IEEE Conference on Computer Vision and Pattern Recognition; pp. 6409-6418; dated 2019.

Jiang, B et al., "Acquisition of Localization Confidence for Accurate Object Detection"; In Proceedings of the European Conference on Computer Vision (ECCV); 16 pages; dated 2018.

Krahenbuhl, P. et al., "Geodesic Object Proposals"; In European Conference on Computer Vision; Springer; pp. 725-739; dated 2014.

Kuo, W. et al., "DeepBox: Learning Objectness with Convolutional Networks"; In Proceedings of the IEEE International Conference on Computer Vision; pp. 2479-2487; dated 2015.

Kuznetsova, A. et al., "The Open Images Dataset V4: Unified Image Classification, Object Detection, and Visual Relationship Detection at Scale"; arXiv.org; preprint arXiv:1811.00982v1; 20 pages; dated Nov. 2, 2018.

Pinheiro, P.O., et al., "Learning to segment object candidates"; In Advances in Neural Information Processing Systems; 9 pages; dated 2015.

Shao, S. et al., "Objects365: A Large-Scale, High-Quality Dataset for Object Detection"; In Proceedings of the IEEE International Conference on Computer Vision; pp. 8430-8439; dated 2019.

Tian, Z. et al., "FCOS: Fully Convolutional One-Stage Object Detection"; In Proceedings of the IEEE International Conference on Computer Vision; pp. 9627-9636; dated 2019.

Wong, K. et al., "Identifying Unknown Instances for Autonomous Driving"; In Conference on Robot Learning; PMLR; 10 pages; dated 2020.

Xie, C. et al., "Unseen Object Instance Segmentation for Robotic Environments"; IEEE Transactions on Robotics; 17 pages; dated 2020.

Yu, J. et al., "UnitBox: An Advanced Object Detection Network"; In Proceedings of the 24th ACM International Conference on Multimedia; 5 pages; dated 2016.

Zhou, X. et al., "Objects as Points"; arXiv.org; arXiv:1904.07850; 12 pages; dated 2019.

Zitnick, C.L. et al., "Edge Boxes: Locating Object Proposals from Edges"; In European Conference on Computer Vision; Springer; pp. 391-405; dated 2014.

* cited by examiner

100

REGION PROPOSAL NETWORK
108

BOX REFINEMENT NETWORK
108A

OBJECTNESS NETWORK
108B

IMAGE FEATURES
106

FEATURE EXTRACTION NETWORK
104

INPUT INSTANCE OF VISION DATA
102

TOP K OBJECT PROPOSALS
110

REGION BASED NETWORK
112

BOX REFINEMENT NETWORK
112A

IOU NETWORK
112B

OBJECT ANNOTATION(S)
114

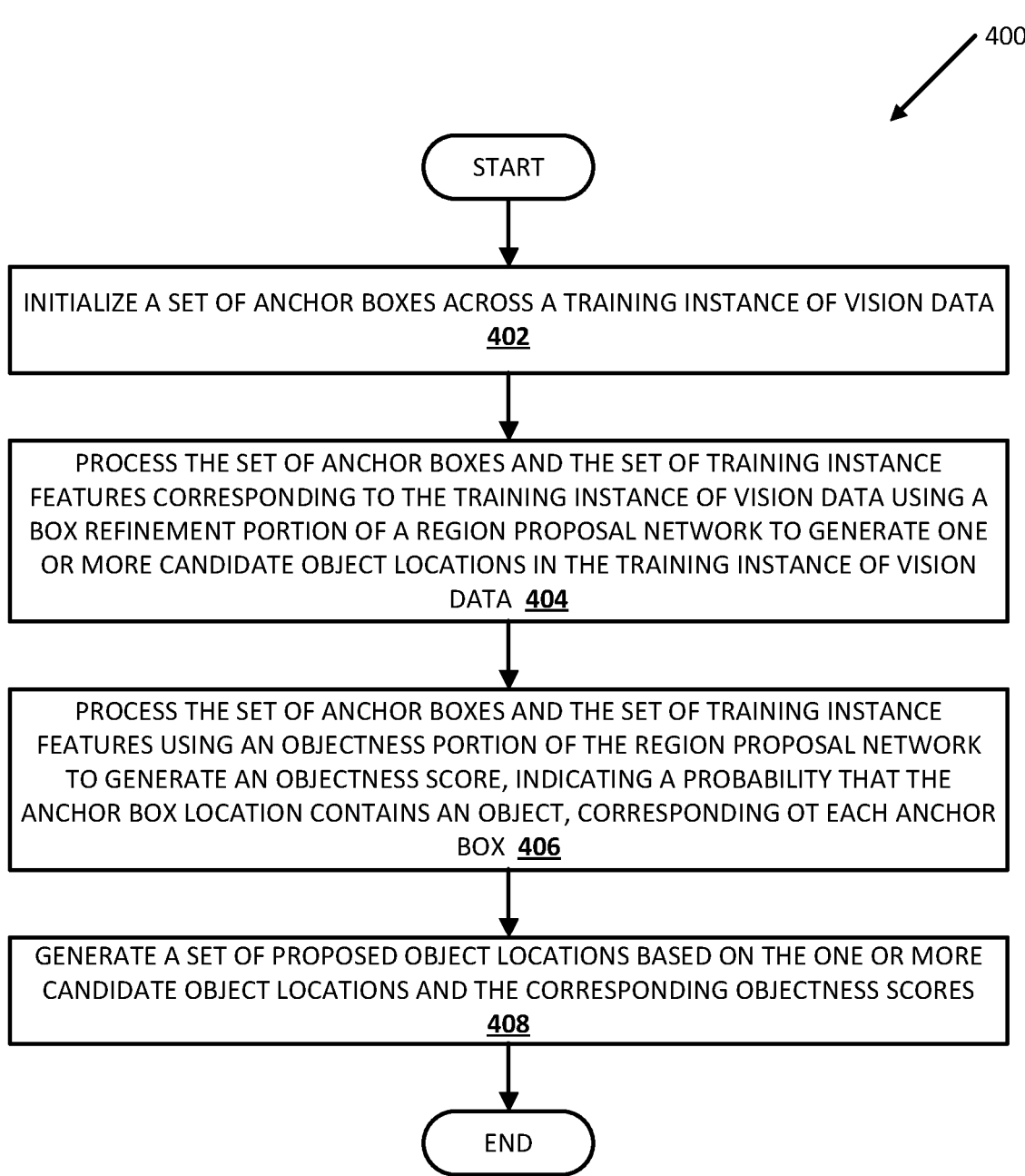

START

INITIALIZE A SET OF ANCHOR BOXES ACROSS A TRAINING INSTANCE OF VISION DATA
402

PROCESS THE SET OF ANCHOR BOXES AND THE SET OF TRAINING INSTANCE FEATURES CORRESPONDING TO THE TRAINING INSTANCE OF VISION DATA USING A BOX REFINEMENT PORTION OF A REGION PROPOSAL NETWORK TO GENERATE ONE OR MORE CANDIDATE OBJECT LOCATIONS IN THE TRAINING INSTANCE OF VISION DATA 404

PROCESS THE SET OF ANCHOR BOXES AND THE SET OF TRAINING INSTANCE FEATURES USING AN OBJECTNESS PORTION OF THE REGION PROPOSAL NETWORK TO GENERATE AN OBJECTNESS SCORE, INDICATING A PROBABILITY THAT THE ANCHOR BOX LOCATION CONTAINS AN OBJECT, CORRESPONDING OT EACH ANCHOR BOX 406

GENERATE A SET OF PROPOSED OBJECT LOCATIONS BASED ON THE ONE OR MORE CANDIDATE OBJECT LOCATIONS AND THE CORRESPONDING OBJECTNESS SCORES 408

END

FIG. 4

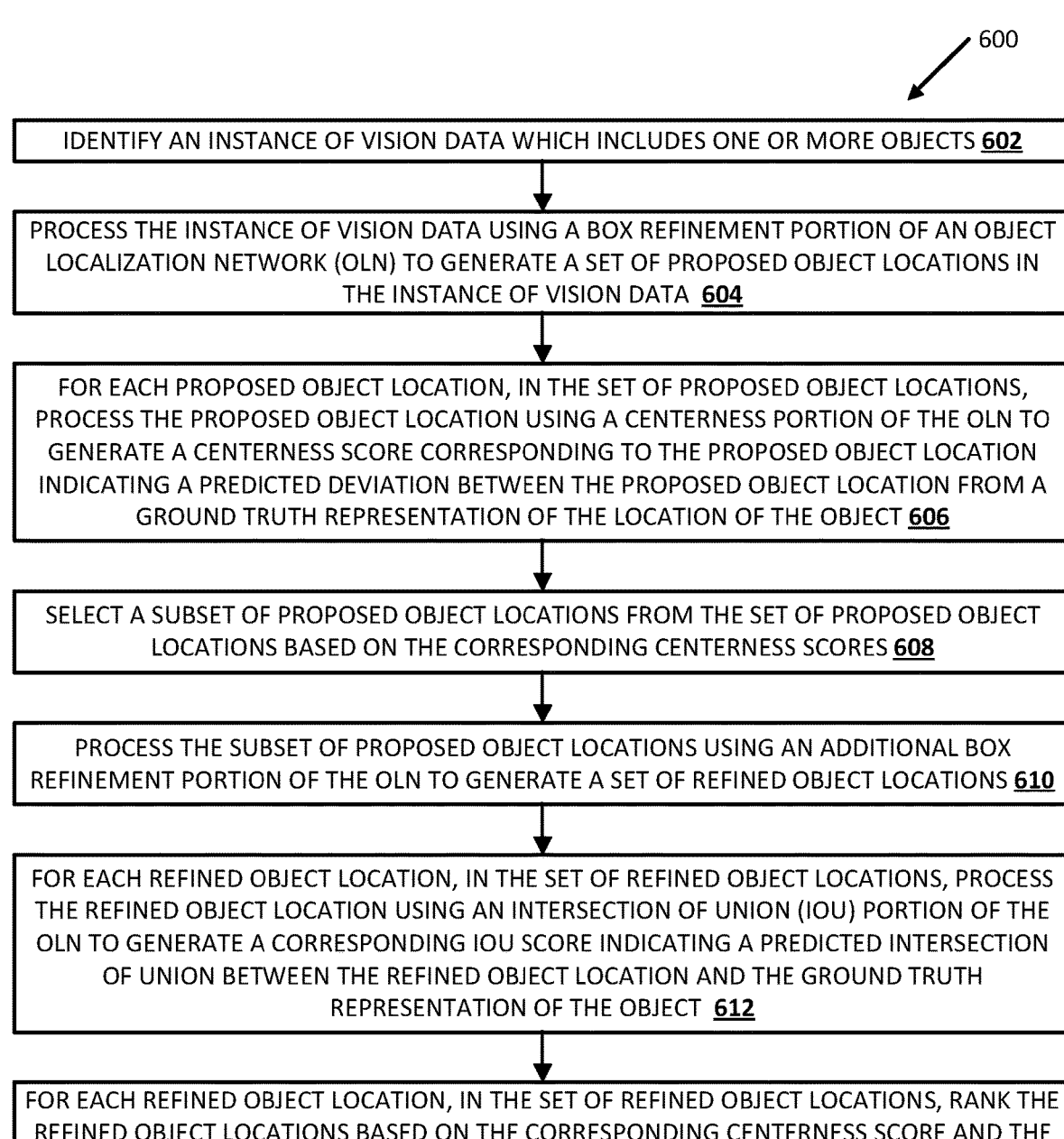

600

IDENTIFY AN INSTANCE OF VISION DATA WHICH INCLUDES ONE OR MORE OBJECTS 602

PROCESS THE INSTANCE OF VISION DATA USING A BOX REFINEMENT PORTION OF AN OBJECT LOCALIZATION NETWORK (OLN) TO GENERATE A SET OF PROPOSED OBJECT LOCATIONS IN THE INSTANCE OF VISION DATA 604

FOR EACH PROPOSED OBJECT LOCATION, IN THE SET OF PROPOSED OBJECT LOCATIONS, PROCESS THE PROPOSED OBJECT LOCATION USING A CENTERNESS PORTION OF THE OLN TO GENERATE A CENTERNESS SCORE CORRESPONDING TO THE PROPOSED OBJECT LOCATION INDICATING A PREDICTED DEVIATION BETWEEN THE PROPOSED OBJECT LOCATION FROM A GROUND TRUTH REPRESENTATION OF THE LOCATION OF THE OBJECT 606

SELECT A SUBSET OF PROPOSED OBJECT LOCATIONS FROM THE SET OF PROPOSED OBJECT LOCATIONS BASED ON THE CORRESPONDING CENTERNESS SCORES 608

PROCESS THE SUBSET OF PROPOSED OBJECT LOCATIONS USING AN ADDITIONAL BOX REFINEMENT PORTION OF THE OLN TO GENERATE A SET OF REFINED OBJECT LOCATIONS 610

FOR EACH REFINED OBJECT LOCATION, IN THE SET OF REFINED OBJECT LOCATIONS, PROCESS THE REFINED OBJECT LOCATION USING AN INTERSECTION OF UNION (IOU) PORTION OF THE OLN TO GENERATE A CORRESPONDING IOU SCORE INDICATING A PREDICTED INTERSECTION OF UNION BETWEEN THE REFINED OBJECT LOCATION AND THE GROUND TRUTH REPRESENTATION OF THE OBJECT 612

FOR EACH REFINED OBJECT LOCATION, IN THE SET OF REFINED OBJECT LOCATIONS, RANK THE REFINED OBJECT LOCATIONS BASED ON THE CORRESPONDING CENTERNESS SCORE AND THE CORRESPONDING IOU SCORE 614

GENERATE ONE OR MORE PREDICTED ANNOTATIONS FOR THE INSTANCE OF VISION DATA BASED ON THE RANKING OF THE SET OF REFINED OBJECT LOCATIONS, WHERE EACH PREDICTED ANNOTATION IDENTIFIES A CORRESPONDING PREDICTED LOCATION OF A CORRESPONDING OBJECT, OF THE ONE OR MORE OBJECTS, IN THE INSTANCE OF VISION DATA 616

FIG. 6

METHODS AND APPARATUS LOCALIZING OBJECT(S) IN VISION DATA

BACKGROUND

Object recognition techniques can be used to identify one or more objects in an instance of vision data (e.g., an image, a sequence of video frames, etc.). For example, an object detector can be trained to identify one or more faces in an image. Similarly, object detection can be used to classify one or more objects in an instance of vision data. For instance, an instance of vision data can include an image of a cat and a dog. An object detector can be trained to identify and classify the cat as well as identify and classify the dog in the image. However, object detectors typically detect and/or classify a discrete set of objects (e.g., objects used in training the object detector) and are unable to detect and/or classify novel objects.

SUMMARY

Techniques disclosed herein are directed towards training an object localization network (OLN) to localize one or more objects in an instance of vision data. The localization data generated using the OLN can be used to detect one or more objects in the instance of vision data. In some implementations, the OLN can be used in general object recognition, where the OLN can be trained based on a set of object annotations to detect dissimilar object(s) which are not in the set of object annotations such as object(s) from untrained categories and/or object(s) from new data sources.

For example, an instance of vision data can include an image of an office. The image of the office can be processed using the OLN to detect one or more objects in the image, such as a desk, a chair, a calendar on the desk, a pen on the desk, a notebook on the desk, and/or one or more additional objects. In some implementations, the OLN can be trained based on a set of training annotations that do not include one or more of the objects detected in the office image. For example, the OLN can be trained based on a set of training annotations that do not include a desk, a char, a calendar, a pen, and/or a notebook. Additionally or alternatively, the OLN can be trained based on a set of training annotations from disparate data source(s). For example, the OLN can be trained based on a set of training annotations that capture object(s) in a backyard, object(s) in a vehicle, etc.

In some implementations, localization of an object using an OLN can include determining a predicted objectness of a region of the instance of vision data. In some implementations, objectness can indicate a probability that an object exists in a proposed region of interest. Objectness can be measured using a centerness measure, which can capture the deviation of a candidate location capturing an object from a corresponding ground truth center of the corresponding object. In some implementations, the OLN can localize an object based on (1) a predicted centerness value corresponding to a region capturing the object and (2) an intersection of union (IoU) value capturing the overlap between the corresponding region capturing the object and a ground truth representation of a corresponding region capturing the corresponding object.

In some implementations, the OLN can be represented by a neural network model. For instance, the OLN can be represented by a two stage refinement network including a region proposal network portion and a region based network portion. The region proposal network can be used to process an instance of vision data to generate a centerness score for one or more proposed regions in the instance of vision data. The region based network can process the instance of vision data and/or the proposed regions in the instance of vision data to generate an intersection of union (IoU) score for one or more of the proposed regions. In some implementations, the OLN can localize predicted objects based on the generated centerness scores and IoU scores. Additionally or alternatively, the OLN can include feature extraction network portion, where the instance of vision data can be processed using the feature extraction network to generate a set of image features. The set of image features can be processed using the region proposal network and/or the region based network in addition to or in place of the instance of vision data.

In some implementations, the OLN can be used to detect one or more objects in an instance of vision data. For example, an instance of vision data can include an image capturing a dining room table where a plate, a cup, a fork, a knife, a spoon, and a napkin are on the table. In the illustrated example, the OLN can localize a variety of objects in the instance of vision data including the plane, the cup, the fork, the knife, the spoon, the napkin, and/or the table itself. In some implementations, the instance of vision data can be processed using a region proposal network portion of the OLN to generate one or more proposed object locations and a objectness score (such as a centerness score) corresponding to each proposed object location. Additionally or alternatively, a region based network portion of the OLN can refine one or more of the proposed object locations generated using the region proposal network. In some implementations, the region based network can generate an IoU score for the one or more refined object locations. A set of object annotations identifying the objects in the instance of vision data can be determined based on the objectness scores and/or the IoU scores corresponding to the refined object locations.

Techniques disclosed herein are directed towards localizing object(s) in an instance of vision data using and using the localization of object(s) for object detection. In contrast, conventional techniques typically classify an object, captured in an instance of vision data, and use this classification for object detection. Object detection models trained using classification based approaches are highly biased by a discrete set of training categories. In other words, the classification based object detection model learns to identify areas of an instance of vision data containing one or more discrete classes of objects, and classifies areas of the instance of vision data without the one or more discrete classes of objects as background. Consequently, classification based object detectors often fail to detect objects outside of the discrete set of classes utilized in training the object detector.

In contrast, implementations disclosed herein are directed towards training an OLN to localize objects in an instance of vision data by learning to identify objectness (e.g., centerness). By learning to identify objectness, the OLN can localize unknown objects that were not previously seen by the OLN during training. Annotation resources and/or computational resources (e.g., power, battery, processor cycles, memory, etc.) can be conserved when training an OLN compared to a classification based object detector. For example, an OLN can recognize any object based on objectness without training the OLN using training instance(s) for each potential object. In contrast, classification based object detectors require training for each class of detected objects. It can be impractical to train a classification based object proposer to detect every class of object that may be encountered.

The above description is provided only as an overview of some implementations disclosed herein. These and other implementations of the technology are disclosed in additional detail below.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 4 is a flowchart illustrating an example process of generating a set of proposed object locations using a region proposal network portion of an OLN in accordance with various implementations disclosed herein.

FIG. 6 is a flowchart illustrating an example process of generating one or more predicted object annotations by processing an instance of vision data using an OLN in accordance with various implementations disclosed herein.

DETAILED DESCRIPTION

Figure 1:
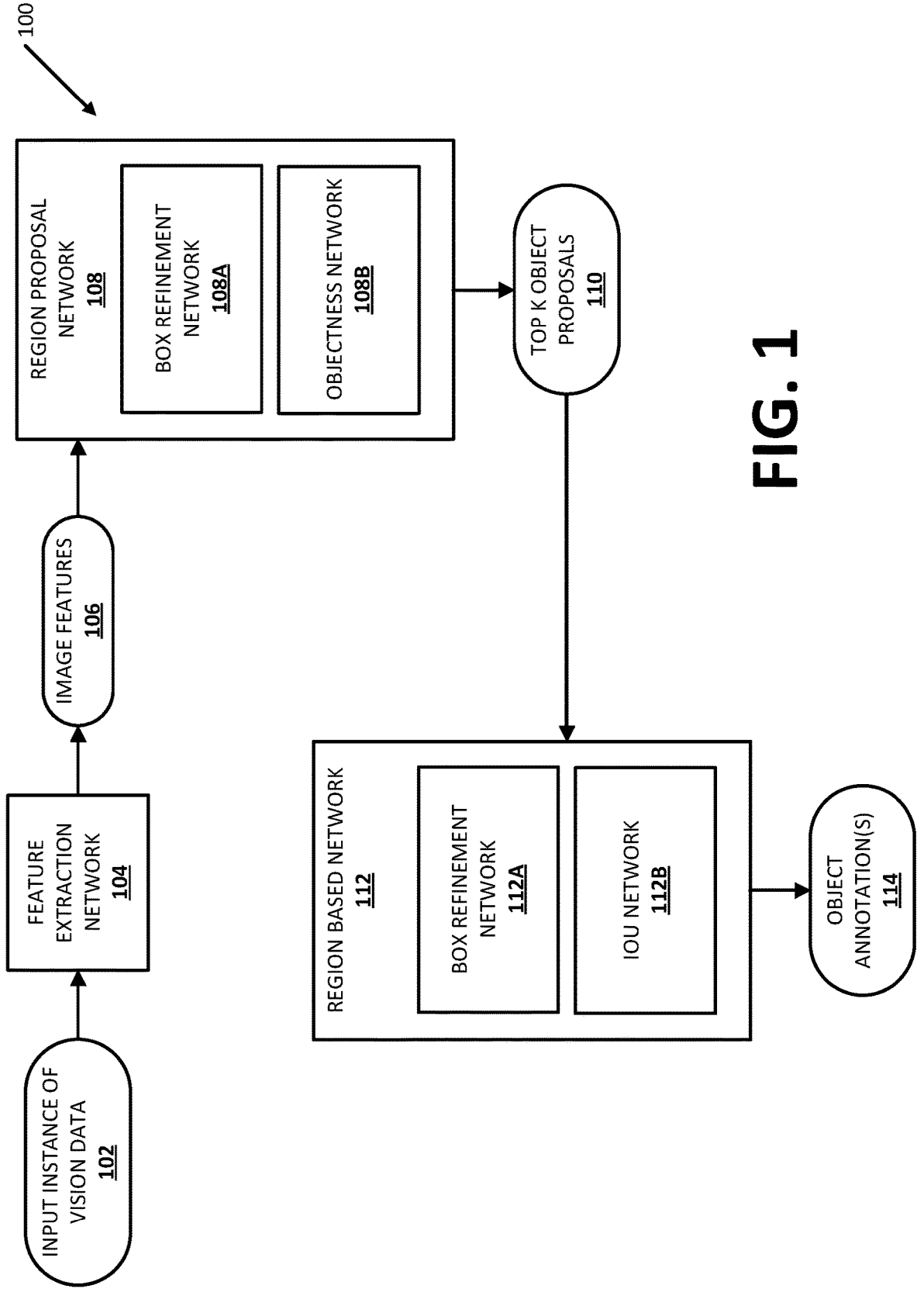
FIG. 1 illustrates an example of generating one or more object annotations using an object localization network (OLN) in accordance with various implementations disclosed herein.

Object detection is a fundamental problem in computer vision, and much of its recent progress has been fueled by increasingly larger detection datasets. Despite such great efforts, the visual world may still contain a lot more objects and categories than what these datasets are able to capture so far. Therefore, existing object detectors may often fail to detect objects outside the pre-defined categories. Implementations disclosed herein are directed towards bypassing the limitation of categories and the introduction the Every Object Detection problem which can demand high precision and/or recall on novel objects. Learning to classify a region as foreground or background can impede generalization because the model learns to classify the unlabeled objects in the training set as background. In contrast, implementations disclosed herein are directed towards an Object Localization Network (OLN), which can learn to detect objects by predicting how well a region is localized (instead of classifying it into foreground or background). This can aid the model to learn stronger objectness cues for generalization.

The ability to recognize objects in the visual world is a core task of computer vision. In the recent years, many object detectors have emerged with strong performance on single dataset settings. While the progress was exciting, these settings are primarily for developing and benchmarking new algorithms. By design, these detectors are unable to detect the majority of objects in the visual world which fall outside of the annotated categories. The limitation of predefined categories prevents the deploying of object detector "in the wild", where it can be wanted for an intelligent system to understand and/or interact with objects in the environment. For example, in a bin-clearing task, a robot may be concerned more about the location of objects rather than their precise categories. Similarly, an autonomous agent navigating in a new environment may be concern more about the location of obstacles rather than their categories.

In fact, the limitations of representing the visual world as discrete categories is not new to the vision community. The concept of categories stems from the natural language humans use to refer to objects. By definition, they can overlap with one another and/or are often ambiguous. In addition, it can be very difficult to enumerate all categories in the visual world. Even if they can be enumerated, it may be almost impossible to annotate them in an exhaustive fashion. This is why existing object detection datasets may focus on within-category generalization and/or same-data source evaluation, which can make labeling tasks more tractable. In addition, the models are typically trained, validated, and tested on data of the same source, which may or may not work well on other data distributions. Despite these great dataset efforts, the continued scaling of supervised, category-specific learning may not aid much for general object understanding. This category-specific view stands in contrast to what humans are able to do. Humans know there is an object even where categories are ambiguous. For example, a human can spot the presence of debris on a surface easily without having to classify the debris. Apart from the limitation of categories, existing detection benchmarks focus on single dataset evaluation. This may hinder the performance of pre-trained detectors applied to novel settings, e.g. training on a first dataset (e.g., COCO), then testing on a second data set (e.g., VLOG100). Intuitively, it can be expected that learning what generic objects look like in one dataset should transfer to other datasets.

Towards the goal of general object recognition, the problem of learning-based object proposals can be revisited. The object proposal can be viewed as an intermediate step of a modern two-stage detection, which may obviate the need for proposals to generalize beyond seen categories. Given a set of object annotations, what general objects look like can be learned and/or highly dissimilar objects can be detected from novel categories and new data sources. This task can be referred to as the Every Object Detection problem, which can emphasize high recall and/or precision as in the standard detection task. For the evaluation of Every Object Detection, some implementations can use the average recall (AR) metrics on detection datasets, because the test sets may not be exhaustively annotated for all objects. The Every Object Detection task may present two unique challenges: 1) the training images are not annotated for all objects, which could penalize true positive predictions, and/or 2) generalization to all objects in the visual world is a harder problem than within-category generalization.

In some implementations, an Object Localization Network (OLN) can be used to address both challenges. A main insight is that the classifier stage in existing detectors tends to overfit to training categories and cause poor performance on the novel objects. This issue can be amplified when the objects are only partially annotated due to the limitation of categories. The classifier learns to classify the unlabeled objects as background. Therefore, in some implementations, replace the classifiers can be replaced by localizers in training time. At test time, the confidence scores of objects can be given by the localization scores, such as object centerness and IoU overlap to the ground truth object. Intuitively speaking, learning to localize can help the model learn stronger and/or more generalizable features for novel objects, while classification tends to learn discriminative features only to separate labeled categories from background.

Recently, learning-based proposals have demonstrated better performance than classical approaches in both precision and recall, and are an important part of two-stage detectors. Despite such progress, learning proposals can still suffer significantly on novel objects. It can be hypothesized this is because the methods to date rely heavily on classification, thereby causing the model to over-fit to the training categories. By learning to localize instead of classify, some implementations can encourage the model to learn salient object-ness cues and/or to generalize better. An orthogonal work seeds the proposals with a depth map and refine them with RGB to detect novel objects. In some implementations, the more general setting of using RGB are tackled.

Existing datasets generally focus on single-dataset settings. Models trained on one dataset are only evaluated on the same dataset. It can be hypothesized that learning objectness on one dataset should also transfer to another dataset, as the saliency cues tend to be more generalizable than class-specific information. Therefore, some implementations disclosed herein can use the generalization setting of training on MS COCO, and then testing on other datasets including RoboNet, Objects365, and Epic-Kitchens.

Some implementations disclosed herein are directed towards a recognition task called Every Object Detection, which aims to learn generalizable objectness to detect every object in a scene. It revisits the problem of learning-based object proposals, while targeting both high precision and recall as in the standard detection task. Given a set of object annotations, the goal of some implementations is to generalize the ability of a trained detector beyond the labeled (pre-defined) categories and/or data sources. In some implementations, the Object Localization Network (OLN) can be used for the every object detection task, where the OLN can learn object detection by predicting object localization.

A Region Proposal Network (RPN) can be used for objectness learning in object detection. The RPN can localize all objects in an image, regardless of their category. An additional or alternative approach for general object detection is to directly extend existing detectors with class-agnostic training, which treats all annotated categories as one foreground category. In some implementations, Faster R-CNN and Mask R-CNN can be used with class-agnostic heads since they are the mainstream detectors.

Some implementations described herein focus on the every object detection task. The crux of the problem is to learn the underlying objectness that can be generalized beyond the annotated objects. One insight is that the standard discriminative classification in modern detectors can be highly biased by a discrete set of training categories. That is, the detector does not need to learn general objectness as long as it can safely treat the unknown objects as background, while learning to fit very well to the labeled classes. To address this problem, various implementations replace the classifiers with localizers in object detection.

In some implementations, an OLN-Box network can be utilized (to distinguish the OLN-Box network from the mask-extended version). In some implementations, OLN-Box is a two-stage box refinement network which consists of a region proposal stage and a region-based (e.g., R-CNN) stage. Instead of classifying a region into foreground or background, OLN detects object by predicting object centerness and overlap of a region.

Given an image, object detection can start with a feature extraction network with feature pyramid connections. In some implementations, this can be followed by the OLN-proposal stage which can refine the sliding window anchors and predicts the centerness score of each anchor location. Additionally or alternatively, the region based stage (e.g., the R-CNN) can take the top-scoring region proposals, crops the features out, and can perform the same box regression and region-IoU prediction. Furthermore, the predicted localization scores can be used at inference time to rank the objectness of detected boxes. Note that, in some implementations, no foreground vs background classification is used throughout the framework.

Given a set of anchor boxes uniformly initialized over the image, the proposal stage of OLN can consists of two parallel localizer branches that perform box refinement and objectness scoring of each anchor box. In some implementations, centerness can be used as the objectness measure, which is the deviation of a location from the ground-truth object center. Every anchor box can be matched with its best overlapping ground-truth box. Formally, if an anchor location$(x, y)$ falls into the ground-truth box $B=(x_0, y_0, x_1, y_1)\in \mathbb{R}^4$ i.e., $x_0 < x < x_1$ and $y_0 < y < y_1$, the ground-truth centerness $c_{x,y}^*$ can be defined by the distances from the location to the four sides of the ground truth box as, $$c_{x,y}^* = \sqrt{\frac{\min(l^*, r^*)}{\max(l^*, r^*)} \times \frac{\min(t^*, b^*)}{\max(t^*, b^*)}} \tag{1}$$

where, $l^* = x - x_0,\ t^* = y - y_0,\ r^* = x_1 - x,\ b^* = y_1 - y,$ which can range from 0 and 1. If the location does not fall into any ground-truth boxes, it is considered a background region and the centerness score for the location can be defined to be zero, $c_{x,y}^*=0$.

Unlike in the conventional RPN, various implementations disclosed herein can use a single anchor per location to enable per-anchor centerness prediction. In some implementations, the size and extent of the anchors can be fixed, and centerness can be a suitable objectness score for an anchor box, as it only considers the anchor's location.

Instead of having a binary classier branch, some implementations use a single-layer branch in parallel with the refinement branch that predicts the centerness of an anchor. For example, during training, 256 anchors having an IoU larger than 0.3 with the matched ground-truth box can be randomly sampled, with the exception of one being sampled from the background region having IoU less than 0.1. In some implementations, smooth-L1 loss can be used to train the centerness regression. Additionally or alternatively, for the box regressor to better blend with the centerness predictor, the standard box regression targets (xyhw) can be replaced with distances from the location to the four sides of the ground-truth box as $d^*=(l^*, r^*, t^*, b^*)$, and IoU loss can be used for the box re-gression. In some implementations, the OLN-proposal stage can use the following loss functions as, $$\mathcal{L}_{centerness} = \mathcal{L}_{smooth-l1}(c, c^*) \tag{2}$$

$$\mathcal{L}_{box-lrtb} = \mathcal{L}_{iou}(d, d^*)$$

In some implementations, the region based stage of the OLN (e.g., the box head of OLN) can take the top-scoring OLN-proposals as input and can perform the second box refinement and localization scoring tasks. Additionally or alternatively, in some implementations, the system does not learn classification in the region based stage (e.g., the R-CNN stage), but instead can learn to predict how well localized the detected boxes are.

In some implementations, the OLN can learn to predict the IoU between the predicted boxes and GT boxes as the localization score. While IoUNet trains a separate network that takes predicted boxes as inputs, in some implementations, the OLN box head only has a single-layer IoU prediction branch in parallel with the box regression branch, and thus is much simpler. Moreover, the IoU prediction branch can directly use the region to output high-quality detection regardless of object categories. For training the box-IoU prediction branch, various implementations can use the top-k, e.g., k=512, proposals as training samples. The training samples are required to have an IoU with the matched GT box larger than 0.3 and are ignored otherwise to balance the dominance of low-IoU samples. In some implementations, smooth-L1 loss can be used for both box $\mathcal{L}_{box}$ and IoU $\mathcal{L}_{bIoU}$ losses.

In summary, in many implementations, the OLN-Box network can be trained with the following loss function $$\mathcal{L}_{OLN-BOX} = \mathcal{L}_{centerness} + \mathcal{L}_{box-lrtb} + \mathcal{L}_{bIoU} + \mathcal{L}_{box}. \tag{3}$$

During inference, some implementations can use the predicted objectness score (e.g., the centerness score) and IoU score of the proposals in each stages to rank the detected boxes, while following the standard Faster R-CNN inference procedure. Specifically, in some implementations, in the proposal stage, the proposals' centerness scores can be used as the ranking keyword in NMS to select top-k scoring boxes. Then the top-k boxes can be forwarded into the region based stage (e.g., the R-CNN stage) to generate final boxes and predict their IoUs. In some implementations, the predicted bIoU score can be multiplied with the centerness score c of the corresponding region, and their geometric mean can be the new objectness score as the final box confidence score as $s_{box}=(c \cdot bIoU)^{1/2}$. In some implementations, OLN-Box can output the top 100 boxes after the NMS.

In some implementations, the OLN-Box model can be extended to perform mask prediction by adding the class-agnostic FCN mask head of Mask R-CNN, which is refer to herein as the OLN-Mask model. The OLN-Mask Model can be trained to regress the IoU between the predicted and its GT mask.

In some implementations, the OLN-Mask includes a mask-IoU predictor which directly branches out from the fourth layer of the added FCN mask head, without having a feedback connection from the mask prediction. In some implementations, the IoU branch can consist of a 3×3 convolution layer, a max pooling layer and three fully connected layers. Additionally or alternatively, during training, mask annotations are assumed to be are available for the training categories, and use smooth-L1 loss for IoU regression. In some implementations, at inference, the predicted mask-IoU (mIoU), box-IoU (bIoU) and centerness scores (c) can be combined into a geometric mean as the final mask confidence score as $s_{mask}=(c \cdot bIoU \cdot mIoU)^{1/3}$.

Turning now to the figures, FIG. 1 illustrates an example 100 of generating one or more object annotations using an object localization network (OLN) in accordance with various implementations disclosed herein. In the illustrated example, an input instance of vision data 102 is processed by a feature extraction network 104 to generate a set of image features 106. In some implementations, the input instance of vision data 102 includes one or more images of a scene. For example, the input instance of vision data 102 can include an image of a house captured using a camera. Additionally or alternatively, the input instance of vision data 102 can include one or more images captured using a variety of sensors including camera, a video a camera, LIDAR, RADAR, one/or more additional or alternatively sensors, and/or combinations thereof. In some implementations, the feature extraction network 104 is part of the OLN. Feature extraction network 104 can extract a variety of features from the input instance of vision data 102. For example, the feature extraction network 104 can include feature pyramid connections.

The image features 106 can be processed using a region proposal network 108 portion of the OLN. The region proposal network 108 can include a box refinement network 108A and an objectness network 108B. In some implementations, a set of anchor boxes can be initialized over the instance of vision data 102. For example, the set of anchor boxes can be uniformly initialized over the instance of vision data. In some implementations, the box refinement network 108A and the objectness network 108B can process the set of image features 106 in parallel. In some implementations, objectness network 108B can be used to generate a centerness value. The centerness value can provide an indication of the deviation between a location in the instance of vision data and from a corresponding ground truth object center. In some implementations, the region proposal network 108 can be used to generate a set of the top k object proposals 110. For example, the region proposal network 108 can generate a set of the top 10 object proposals, top 50 object proposals, top 100 proposals, etc.

The top k object proposals 110 can be process using a region based network 112 portion of the OLN to generate a set of object annotation(s) 114. In some implementations, the region based network 112 can include a box refinement network portion 112A and an IoU network portion 112B. In some implementations, box refinement network 112A and IoU network 112B can process the top k object proposals 110 in parallel. Object annotation(s) 114 can indicate the location of one or more objects in the input instance of vison data 102. For example, the object annotation for an object can include a bounding box capturing the object, the coordinates of the object, the coordinates of the center of the object, an indication of one or more pixels which capture the object, one or more additional or alternative object annotations, and/or combinations thereof.

The example OLN described with respect to FIG. 1 is described with the region proposal network 108 including the objectness network 108B as well as the region based network 112 including IoU network 112B. However this is not meant to be limiting and is merely illustrative. In some implementations, the region proposal network 108 can include an IoU network in place of the objectness network 108B (not depicted) and the region based network 112 can include an objectness network in place of the IoU network 112B (not depicted). Similarly, in some implementations, the region proposal network 108 can include the objectness network 108B and the region based network 112 can include an additional objectness network in place of the IoU network 112B (not depicted). Furthermore, in some implementations, the region proposal network 108 can include an additional IoU network in place of the objectness network 108B (not depicted) and the region based network 112 can include the IoU network 112B.

Figure 2:
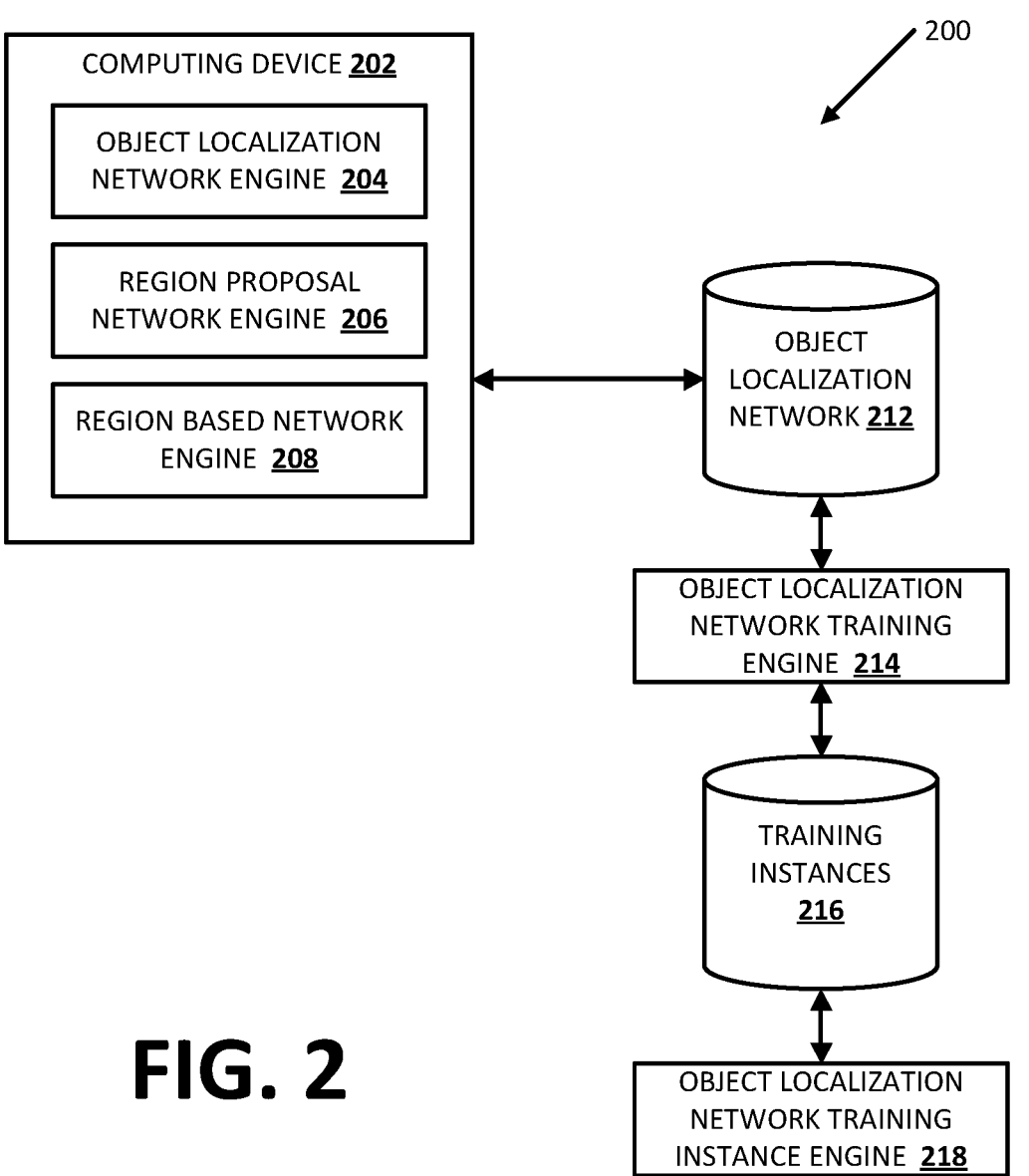
FIG. 2 illustrates an example environment in which various implementations disclosed herein may be implemented.

FIG. 2 illustrates an example environment 200 in which various implementations disclosed herein may be implemented. The example environment 200 includes a computing system 202 which can include object localization network engine 204, region proposal network engine 206, region based network engine 208, object localization network training engine 214, object localization network training instance engine 218 and/or additional or alternative engine(s) (not depicted). Additionally or alternatively, computing system 202 may be associated with object localization network 212, training instances 216, additional or alternative model(s) (not depicted), and/or additional or alternative training data (not depicted).

In some implementations, computing system 202 may include may include user interface input/output devices (not depicted), which may include, for example, a physical keyboard, a touch screen (e.g., implementing a virtual keyboard or other textual input mechanisms), a microphone, a camera, a display screen, and/or speaker(s). The user interface input/output devices may be incorporated with one or more computing system 202 of a user. For example, a mobile phone of the user may include the user interface input output devices; a standalone digital assistant hardware device may include the user interface input/output device; a first computing device may include the user interface input device(s) and a separate computing device may include the user interface output device(s); etc. In some implementations, all or aspects of computing system 202 may be implemented on a computing system that also contains the user interface input/output devices.

Some non-limiting examples of computing system 202 include one or more of: a desktop computing device, a laptop computing device, a standalone hardware device at least in part dedicated to an automated assistant, a tablet computing device, a mobile phone computing device, a computing device of a vehicle (e.g., an in-vehicle communications system, and in-vehicle entertainment system, an in-vehicle navigation system, an in-vehicle navigation system), or a wearable apparatus of the user that includes a computing device (e.g., a watch of the user having a computing device, glasses of the user having a computing device, a virtual or augmented reality computing device). Additional and/or alternative computing systems may be provided. Computing system 202 may include one or more memories for storage of data and software applications, one or more processors for accessing data and executing applications, and other components that facilitate communication over a network. The operations performed by computing system 202 may be distributed across multiple computing devices. For example, computing programs running on one or more computers in one or more locations can be coupled to each other through a network.

Object localization network engine 204 can process one or more instances of vision data, such as one or more images, using OLN 212 to generate one or more object annotations for the one or more instances of vision data. In some implementations, object localization network engine 204 can process the one or more instances of vision data using a feature extraction network (not depicted) to generate one or more image features. In some of those implementations, the object localization network engine 204 can process the one or more instances of vision data and/or the one or more corresponding image features using the OLN 212 to generate the object annotation(s). For example, object localization network engine 204 can process one or more instances of vision data 102 and/or corresponding image features 106 using OLN 212 to generate one or more object annotations 114. In some implementations, object localization network engine 204 can generate the one or more object annotations in accordance with process 600 of FIG. 6 described herein.

In some implementations, OLN 212 can include a regional proposal network portion (not depicted) and a region based network portion (not depicted). Region proposal network engine 206 can process one or more instances of vision data and/or one or more corresponding image features using the region proposal network portion of OLN 212 to generate the top k object proposals (e.g., the top 10 object proposals, the top 50 object proposals, the top 100 object proposals, etc.). In some implementations, the region proposal network portion of OLN 212 can include a box refinement portion and an objectness portion (not depicted). In some of those implementations, regional proposal network engine 206 can process the input instance(s) of vision data and/or corresponding image feature(s) using the box refinement portion and the objectness portion in parallel. The box refinement portion can be used to generate additional or alternative anchor boxes in the input vision data and/or corresponding image features. Additionally or alternatively, the objectness portion can be used to generate an objectness value, indicating a likelihood a location in the instance of vision data contains an object. For example, the objectness value can be a centerness value, which indicates a deviation between a location in the instance of vision and from a corresponding ground truth object center. In some implementations, region proposal network engine 206 can generate a set of proposed object locations in accordance of process 400 of FIG. 4 described herein.

Region based network engine 208 can use the region based network portion of OLN 212 to generate one or more object annotations, each object annotation indicating an object in the instance(s) of vision data. For example, an object annotation can include a bounding box capturing the object, the coordinates of the object, the coordinates of the center of the object, an indication of pixel(s) which capture the object, etc. In some implementations, the region based network engine 208 can process one or more top object proposals (e.g., top object proposals generated using the region proposal network engine 206) using the regional based network portion of the OLN 212 to generate the object annotation(s). In some implementations, the region based network portion of the OLN 212 can include an additional box refinement portion and an intersection of union portion (not depicted). In some of those implementations, the additional box refinement portion and the intersection of union portion can process the top object proposal(s) in parallel. The additional box refinement portion can be used to refine one or more of the object proposal locations. Additionally or alternatively, the intersection of union portion can be used to generate an IoU value capturing the overlap between the corresponding candidate region capturing the object and a ground truth representation of a corresponding region capturing the corresponding object. In some implementations, region based network engine 208 can generate one or more object annotations in accordance with process 500 of FIG. 5 described herein.

Training instances 216 can include a training instance of vision data and one or more training annotations, where each training annotation identifies a ground truth location of a corresponding object location of an object in the training instance of vision data. In some implementations, one or more training instances 216 can be generated using object localization network training instance engine 218. OLN 212 can be trained using object localization network training engine 214. In some implementations, object localization network training engine 214 can process one or more training instances 216 to train OLN 212. For example, object localization network training engine 214 can process an instance of vision data corresponding to the selected training instance 216 using a feature extraction network (e.g., a feature extraction network portion of the OLN 212) to generate a set of training instance features. The set of training instance features and/or the instance of vision data can be processed using OLN 212 to generate one or more predicted object annotations for the instance of vision data. A loss can be generated based on the one or more predicted annotations and one or more ground truth training annotations of the corresponding training instance. Additionally or alternatively, one or more portions of the OLN 212 can be updated based on the generated loss. In some implementations, object localization network training engine 214 can train OLN 212 using one or more training instances 216 in accordance with process 300 of FIG. 3 described herein.

Figure 3:
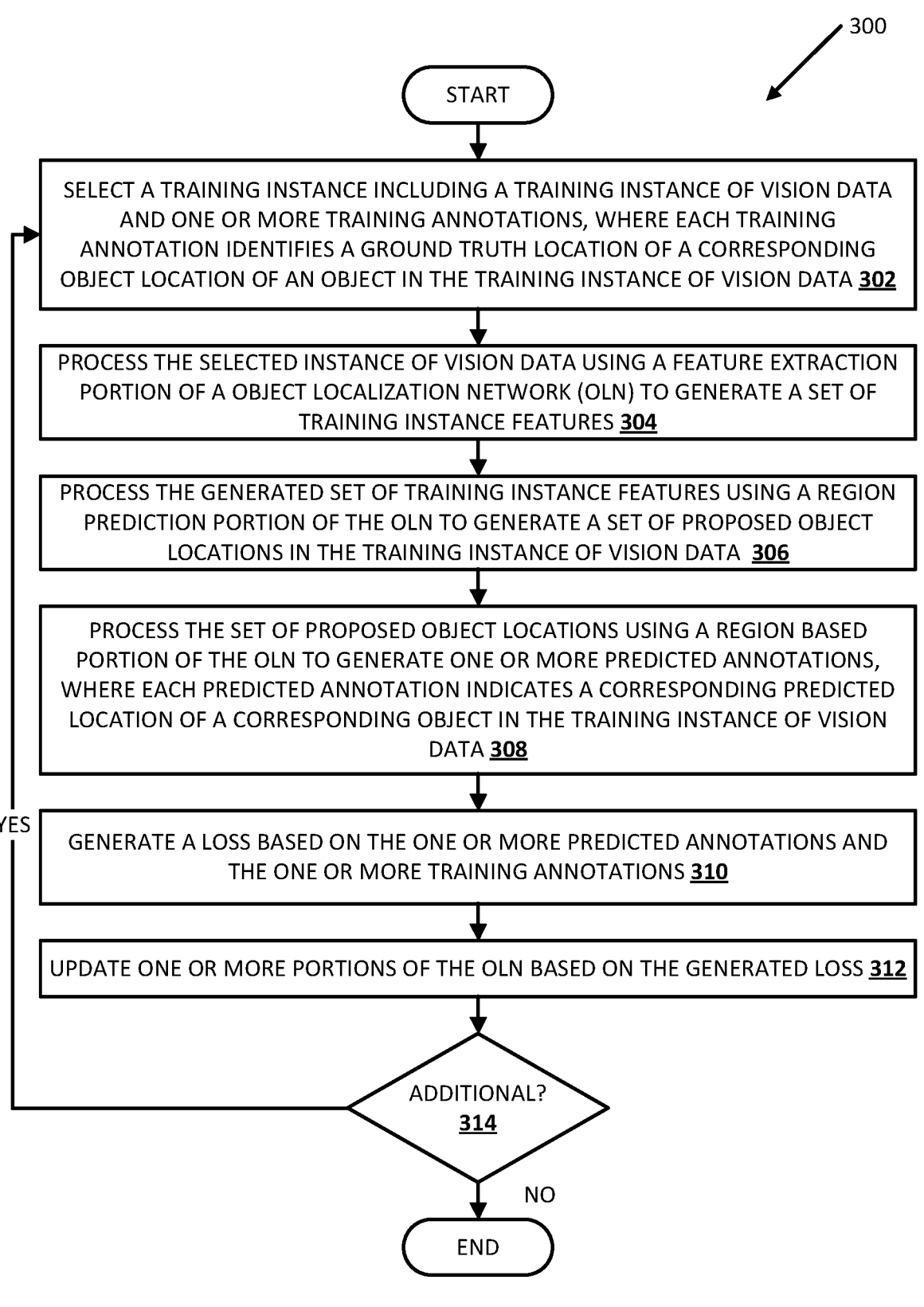
FIG. 3 is a flowchart illustrating an example process of training an OLN in accordance with various implementations disclosed herein.

FIG. 3 is a flowchart illustrating an example process of 300 of training an OLN in accordance with various implementations disclosed herein. For convenience, the operations of the flowchart are described with reference to a system that performs the operations. This system may include various components of various computer systems, such as one or more components of computing system 202 and/or computing system 710. Moreover, while operations of process 300 are shown in a particular order, this is not meant to be limiting. One or more operations may be reordered, omitted, and/or added.

At block 302, the system selects a training instance. In some implementations, the training instance includes a training instance of vision data and one or more training annotations, where each training annotation identifies a ground truth location of a corresponding object location of an object in the training instance of vision data. For example, the training instance can include an image capturing a garden and one or more ground truth locations of one or more objects in the garden (e.g., plants, gardening tools, etc.). In some implementations, the training instance can include an instance of vision data and the ground truth location of a single object captured in the instance of vision data. For example, the training instance can include an image of capturing a table and a ground truth location of the table in the image.

At block 304, the system processes the selected instance of vision data using a feature extraction portion of an object localization network (OLN) to generate a set of training instances features. In some implementations, feature extraction network can feature include pyramid connections. A variety of feature extraction networks can be utilized. For example, the feature extraction network can extract one or more candidate object locations, one or more edges, one or more corners, one or more additional or alternative features, and/or combinations thereof.

At block 306, the system processes the generated set of training features using a region prediction portion of the OLN to generate a set of proposed object locations in the training instance of vision data. In some implementations, the region prediction network can include a box refinement network portion and an objectness network portion. For example, the region prediction portion of the OLN can include box refinement network 108A and objectness network 108B as illustrated in FIG. 1 herein. The objectness network can be used to generate an objectness value indicating a probability an area of the image contains an object. In some implementations, the objectness network can include a centerness network, where the centerness network can be used to generate a centerness value indicating the predicted deviation of a candidate location capturing an object from a corresponding ground truth center of the corresponding object. In some implementations, the set of proposed object locations can include the top k object locations generated using the region proposal network. In some implementations, the system can generate the set of proposed object locations in accordance with process 400 of FIG. 4 described herein.

At block 308, the system processes the set of proposed object locations using a region based portion of the OLN to generate one or more predicted annotations, where each predicted annotation indicates a corresponding predicted location of a corresponding object in the training instance of vision data. In some implementations, the region based network can include a box refinement network portion and an IoU network portion. For example, the region based network can include the box refinement network 112A and IoU network 112B illustrated in FIG. 1 herein. In some implementations, the IoU network can be used to generate an IoU score indicating a predicted overlap between the corresponding region capturing the object and a ground truth representation of a corresponding region capturing the corresponding object. In some implementations, a predicted annotation can include a bounding box surrounding the predicted object, coordinates of the predicted object, a set of pixels capturing the predicted object, one or more additional or alternative annotations, and/or combinations thereof. In some implementations, the system can generate the one or more predicted annotations in accordance with process 500 described in FIG. 5 herein.

At block 310, the system generates a loss based on the one or more predicted annotations and the one or more training annotations. For example, the system can generate a loss based on the difference between the location of one or more predicted annotations and a corresponding ground truth location of the one or more training annotations.

At block 312, the system updates one or more portions of the OLN based on the generated loss.

At block 314, the system determines whether to process an additional training instance. If so, the system proceeds back to block 302, selects an additional training instance, and proceeds to blocks 304, 306, 308, 310, and 312 based on the additional training instance. In some implementations, the system can determine whether to process an additional training instance based on whether there are any remaining unprocessed training instances, whether a threshold number of training instances have been processed, whether a threshold duration of training time has been satisfied, whether one or more additional or alternative conditions have been satisfied, and/or combinations thereof. If not, the process ends.

FIG. 4 is a flowchart illustrating an example process of 400 of generating a set of proposed object locations using a region proposal network portion of an OLN in accordance with various implementations disclosed herein. For convenience, the operations of the flowchart are described with reference to a system that performs the operations. This system may include various components of various computer systems, such as one or more components of computing system 202 and/or computing system 710. Moreover, while operations of process 400 are shown in a particular order, this is not meant to be limiting. One or more operations may be reordered, omitted, and/or added.

At block 402, the system initializes a set of anchor boxes across a training instance of vision data. In some implementations, the system the set of anchor boxes can be uniformly distributed across the training instance of vision data.

At block 404, the system processes the set of anchor boxes and a set of training instance features corresponding to the training instance of vision data using a box refinement portion of a region proposal network to generate one or more candidate object locations in the training instance of vision data. In some implementations, the set of training instances features are generated by processing the training instance of vision data using a feature extraction network portion of the OLN.

At block 406, the system processes the set of anchor boxes and the set of training instance features using an objectness network portion of the region proposal network to generate an objectness value corresponding to each anchor box. In some implementations, the objectness value can indicate a probability that the anchor box location contains an object. In some implementations, the objectness network portion can be a centerness network which can be used to generate a centerness value. The centerness value can indicate the predicted deviation of a candidate location capturing an object from a corresponding ground truth center of the corresponding object.

Figure 5:
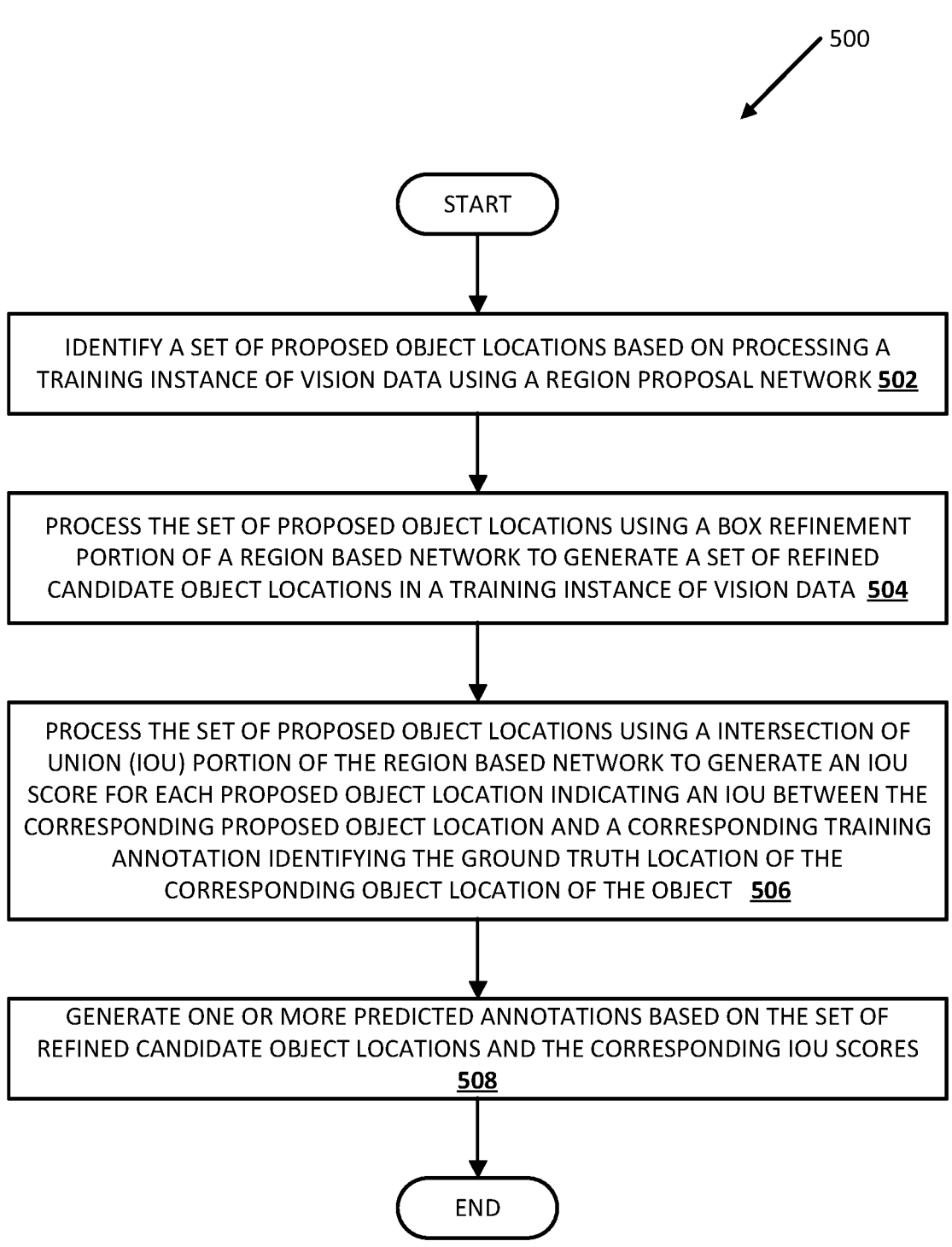
FIG. 5 is a flowchart illustrating an example process of generating one or more predicted object annotations using a region based network portion of an OLN in accordance with various implementations disclosed herein.

At block 408, the system generates a set of proposed object locations based on the one or more candidate object locations and the corresponding objectness scores. In some implementations, the set of proposed object locations can include the top k proposed object locations (e.g., the top 10 proposed object locations, the top 50 proposed object locations, the top 100 proposed object locations, etc.). In some of those implementations, the top k proposed object locations can be determined based on the corresponding objectness values and/or centerness values FIG. 5 is a flowchart illustrating an example process of 500 of generating one or more predicted object annotations using a region based network portion of an OLN in accordance with various implementations disclosed herein. For convenience, the operations of the flowchart are described with reference to a system that performs the operations. This system may include various components of various computer systems, such as one or more components of computing system 202 and/or computing system 710. Moreover, while operations of process 500 are shown in a particular order, this is not meant to be limiting. One or more operations may be reordered, omitted, and/or added.

At block 502, the system identifies a set of proposed object locations based on processing a training instance of vision data using a region proposal network. In some implementations, the set of proposed object locations can be generated in accordance with process 400 of FIG. 4 described herein.

At block 504, the system processes the set of proposed object locations using a box refinement portion of a region based network to generate a set of refined candidate object locations in a training instance of vision data.

At block 506, the system processes the set of proposed object locations using an intersection of union (IoU) portion of the region based network to generate an IoU score for each proposed object location. In some implementations, the IoU score can indicate an intersection of union between the corresponding proposed object location and a corresponding training annotation, where the training annotation identifies a ground truth location of the corresponding object location of the object.

At block 508, the system generates one or more predicted annotations based on the set of refined candidate object locations and the corresponding IoU scores. The predicted annotations indicate the locations of proposed objects in the instance of vision data. In some implementations, a predicted annotation can include a bounding box identifying a predicted object, one or more coordinates identifying a predicted object, one or more pixels associated with the predicted object, one or more additional or alternative annotations, and/or combinations thereof.

FIG. 6 is a flowchart illustrating an example process of 600 of generating one or more predicted object annotations by processing an instance of vision data using an OLN in accordance with various implementations disclosed herein. For convenience, the operations of the flowchart are described with reference to a system that performs the operations. This system may include various components of various computer systems, such as one or more components of computing system 202 and/or computing system 710. Moreover, while operations of process 600 are shown in a particular order, this is not meant to be limiting. One or more operations may be reordered, omitted, and/or added.

At block 602, the system identifies an instance of vision data which includes one or more objects. For example, the instance of vision data can include an image capturing an office including several objects, such as a desk, a chair, a lamp, a trash can, a calendar, and/or one or more additional or alternative objects.

At block 604, the system processes the instance of vision data using a box refinement portion of an OLN to generate a set of proposed object locations in the instance of vision data. For example, the proposed object locations can be the ground truth representation of the location of the object, the proposed object location may not capture any portion of any object, the proposed object location may capture one or more portions of one or more objects, etc. In some implementations, the system can generate the set of proposed object locations in accordance with process 400 of FIG. 4 described herein.

At block 606, for each proposed object location in the set of proposed object locations, the system processes the proposed object location using a centerness portion of the OLN to generate a centerness score corresponding to the proposed object location indicating a predicted deviation between the proposed object location from a ground truth representation of the location of the object. In some implementations, the system can generate the centerness score in accordance with process 400 of FIG. 4 described herein.

At block 608, the system selects a subset of the proposed object locations from the set of proposed object locations based on the corresponding centerness scores. For example, the system can select the top k proposed object locations based on the centerness scores.

At block 610, process the subset of proposed object locations using an additional box refinement portion of the OLN to generate a set of refined object locations. In some implementations, the system can generate the set of refined object locations in accordance with process 500 of FIG. 5 described herein.

At block 612, for each refined object location in the set of object locations, the system processes the refined object location using an IOU portion of the OLN to generate a corresponding IOU score. In some implementations, the IOU score can indicate a predicted intersection of union between the refined object location and the ground truth representation of the object. In some implementations, the system can generate the IOU scores in accordance with process 500 of FIG. 5 described herein.

At block 614, for each refined object location in the set of refined object locations, the system ranks the refined object location based on the corresponding centerness score and the corresponding IOU score.

At block 616, the system generates one or more predicted annotations for the instance of vision data based on the ranking of the set of refined object locations. In some implementations, each predicted annotation identifies a corresponding predicted location of a corresponding object, of the one or more objects, in the instance of vision data. In some implementations, the one or more predicted annotations can identify one or more objects represented in training instances used to train the OLN. Additionally or alternatively, the one or more predicted annotations can identify one or more novel objects not used in training the OLN.

Figure 7:
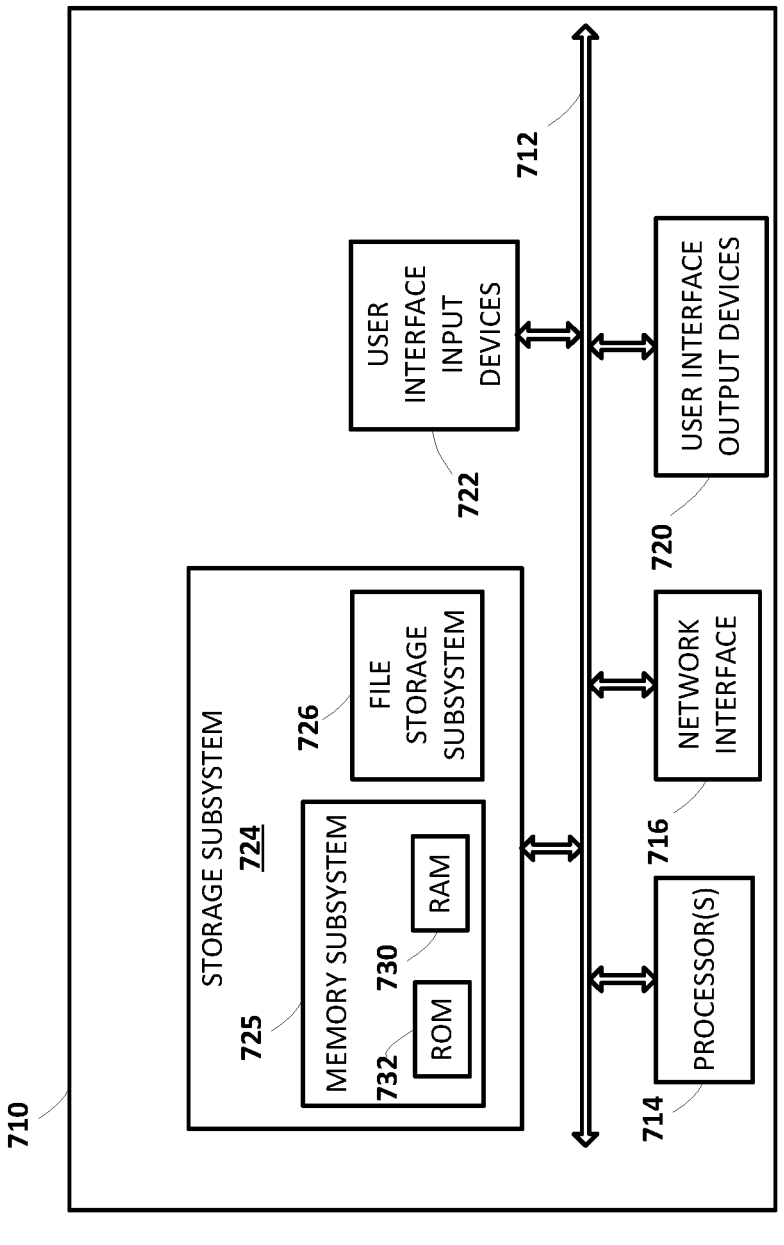
FIG. 7 illustrates an example architecture of a computing device.

FIG. 7 is a block diagram of an example computing device 710 that may optionally be utilized to perform one or more aspects of techniques described herein. In some implementations, one or more of a client computing device, and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of one or more of the processes of FIG. 3, FIG. 4, FIG. 5, and/or FIG. 6 as well as to implement various components depicted in FIG. 2.

These software modules are generally executed by processor 714 alone or in combination with other processors. Memory 725 used in the storage subsystem 724 can include a number of memories including a main random access memory ("RAM") 730 for storage of instructions and data during program execution and a read only memory ("ROM") 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, the method includes training an Object Localization Network (OLN) to detect one or more objects, in an instance of vision data, based on predicted object localization. In some implementations, training the OLN includes selecting a training instance including a training instance of vision data and one or more training annotations, where each training annotation in the one or more training annotations identifies a ground truth location of a corresponding object location of an object, in the training instance of vision data. In some implementations, the method further includes processing the training instance of vision data using a feature extraction network portion of the OLN to generate a set of training instance features. In some implementations, the method further includes processing the set of training instance features using a region proposal portion of the OLN to generate a set of proposed object locations in the training instance of vision data. In some implementations, the method further includes processing the set of proposed object locations using a region based portion of the OLN to generate one or more predicted annotations, where each predicted annotation in the one or more predicted annotations identifies a corresponding predicted location of a corresponding object location in the training instance of vision data. In some implementations, the method further includes generating a loss based on comparing the one or more predicted annotations and the one or more training annotations of the training instance of vision data. In some implementations, the method further includes updating one or more portions of the OLN based on the generated loss.

These and other implementations of the technology can include one or more of the following features.

In some implementations, training the OLN further includes selecting an additional training instance including an additional training instance of vision data and one or more additional training annotations, where each additional training annotation in the one or more additional training annotations identifies an additional ground truth location of an additional corresponding object location of an additional object, in the additional training instance of vision data. In some implementations, the method further includes processing the additional training instance of vision data using the feature extraction network portion of the OLN to generate an additional set of training instance features. In some implementations, the method further includes processing the additional set of training instance features using the region proposal portion of the OLN to generate an additional set of proposed object locations in the additional training instance of vision data. In some implementations, the method further includes processing the additional set of proposed object locations using the region based portion of the OLN to generate one or more additional predicted annotations, where each additional predicted annotation in the one or more additional predicted annotations identifies a corresponding predicted location of a corresponding additional object location in the additional training instance of vision data. In some implementations, the method further includes generating an additional loss based on comparing the one or more additional predicted annotations and the one or more additional training annotations of the additional training instance of vision data. In some implementations, the method further includes updating one or more additional portions of the OLN based on the generated additional loss.

In some implementations, the feature extraction network portion of the OLN includes one or more feature pyramid connections, and wherein the set of training instance features include one or more feature maps.

In some implementations, processing the set of training instance features using the region proposal portion of the OLN to generate the set of proposed object locations in the training instance of vision data includes initializing a set of anchor boxes across the training instance of vision data. In some implementations, the method further includes processing the set of anchor boxes and the set of training instance features to generate the set of proposed object locations, wherein processing the set of anchor boxes and the set of training instances features to generate the set of proposed object locations includes processing the set of anchor boxes and the set of training instance features using a box refinement portion of the region proposal network to generate one or more candidate object locations in the training instance of vision data. In some implementations, the method further includes processing the set of anchor boxes and the set of training instance features using an objectness portion of the region proposal network to generate an objectness score for each anchor box, in the set of anchor boxes, wherein the objectness score indicates a probability the anchor box contains an object. In some implementations, the method further includes generating the set of proposed object locations based on the one or more candidate object locations and the corresponding objectness scores. In some versions of those implementations, the objectness score indicating the probability the anchor box contains an object is a centerness score indicating a deviation of a location from a corresponding ground truth object center. In some versions of those implementations, processing the set of proposed object locations using the region based portion of the OLN to generate the one or more predicted annotations, where each predicted annotation in the one or more predicted annotations identifies the corresponding predicted location of a corresponding object location in the training instance of vision data includes processing the set of proposed object locations using a box refinement portion of the region based network to generate a set of refined candidate object locations in the training instance of vision data. In some implementations, the method further includes processing the set of proposed object locations using an intersection of union (IoU) portion of the region based network to generate an IoU score for each proposed object location in the set of proposed object locations, where the IoU score indicates an intersection of union between the corresponding proposed object location and a corresponding training annotation identifying the ground truth location of the corresponding object location of the object. In some implementations, the method further includes generating the one or more predicted annotations based on the set of refined candidate object locations and the corresponding IoU scores.

In some implementations, the region based network portion of the OLN is a region based convolutional neural network (R-CNN). In some versions of those implementations, the R-CNN is a faster R-CNN.

In some implementations, each training annotation of the one or more training annotations includes a training bounding box identifying the corresponding object location of an object in the training instance of vision data.

In some implementations, each predicted annotation of the one or more predicted annotations includes a predicted bounding box identifying the corresponding object location of a predicted object in the training instance of vision data.

In some implementations, the method further includes receiving a given instance of vision data. In some implementations, the method further includes detecting one or more given objects in the given instance of vision data based on processing the given instance of vision data using the trained OLN. In some versions of those implementations, detecting the one or more given objects in the given instance of vision data based on processing the given instance of vision data using the trained OLN includes processing the given instance of vision data using the feature extraction network portion of the OLN to generate a set of given instance features. In some versions of those implementations, the method further includes processing the set of given instance features using the region proposal portion of the OLN to generate a set of given proposed object locations in the given instance of vision data. In some versions of those implementations, the method further includes processing the set of given proposed object locations using the region based portion of the OLN to generate one or more given predicted annotations, where each given predicted annotation in the one or more given predicted annotations identifies a corresponding predicted location of a corresponding object location in the given instance of vision data. In some versions of those implementations, the method further includes generating the one or more given objects in the given instance of vision data based on the set of given proposed object locations and the one or more given predicted annotations.

In some implementations, a method implemented by one or more processors is provided, the method includes identifying an instance of vision data including one or more objects. In some implementations, the method further includes detecting the one or more objects in the instance of vision data, wherein detecting the one or more objects includes processing the instance of vision data using an Object Localization Network (OLN) to generate one or more predicted annotations, where each predicted annotation in the one or more predicted annotations identifies a corresponding predicted location of a corresponding object, of the one or more objects in the instance of vision data. In some implementations, processing the instance of vision data using the OLN to generate the one or more predicted annotations includes processing the instance of vision data using a box refinement portion of the OLN to generate a set of proposed object locations in the instance of vision data. In some implementations, for each proposed object location in the set of proposed object locations, the method further includes processing the proposed object location using a centerness portion of the OLN to generate a centerness score corresponding the proposed object location indicating a predicted deviation of the proposed object location from a ground truth representation of the location of the object. In some implementations, the method further includes selecting a subset of proposed object locations from the set of proposed object locations based on the corresponding centerness scores. In some implementations, the method further includes processing the subset of the proposed object locations using an additional box refinement portion of the OLN to generate a set of refined object locations. In some implementations, for each refined object location in the set of refined object locations, the method further includes processing the refined object location using an intersection of union (IoU) portion of the OLN to generate a corresponding IoU score indicating a predicted intersection of union between the refined object location and the ground truth representation of the object. In some implementations, the method further includes ranking the set of refined object locations, where the rank of each refined object location, in the set of refined object locations, is based on the corresponding centerness score and the corresponding IoU score. In some implementations, the method further includes detecting the one or more objects based on the ranking of the set of refined object locations.

These and other implementations of the technology can include one or more of the following features.

In some implementations, at least one of the one or more objects detected in the instance of vision data are captured in one or more training instances used to train the OLN. In some versions of those implementations, at least one of the one or more objects detected in the instance of vision data were not captured in one or more training instances used to train the OLN.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the methods described herein. Some implementations also include one or more transitory or non-transitory computer readable storage media storing computer instructions executable by one or more processors to perform any of the methods described herein.

What is claimed is:

1. A method implemented by one or more processors, the method comprising:

training an Object Localization Network (OLN) to detect one or more objects, in an instance of vision data, based on predicted object localization, wherein training the OLN comprises:

selecting a training instance including a training instance of vision data and one or more training annotations, where each training annotation in the one or more training annotations identifies a ground truth location of a corresponding object location of an object, in the training instance of vision data;

processing the training instance of vision data using a feature extraction network portion of the OLN to generate a set of training instance features;

processing the set of training instance features using a region proposal portion of the OLN to generate a set of proposed object locations in the training instance of vision data;

processing the set of proposed object locations using a region based portion of the OLN to generate one or more predicted annotations, where each predicted annotation in the one or more predicted annotations identifies a corresponding predicted location of a corresponding object location in the training instance of vision data;

generating a loss based on comparing the one or more predicted annotations and the one or more training annotations of the training instance of vision data; and updating one or more portions of the OLN based on the generated loss;

wherein processing the set of training instance features using the region proposal portion of the OLN to generate the set of proposed object locations in the training instance of vision data comprises:

initializing a set of anchor boxes across the training instance of vision data;

processing the set of anchor boxes and the set of training instance features to generate the set of proposed object locations, wherein processing the set of anchor boxes and the set of training instances features to generate the set of proposed object locations comprises:

processing the set of anchor boxes and the set of training instance features using an objectness portion of the region proposal portion to generate a centerness score for each anchor box, in the set of anchor boxes, wherein the centerness score indicates a deviation from a corresponding ground truth object center; and generating the set of proposed object locations based on the corresponding centerness scores.

2. The method of claim 1, wherein training the OLN further comprises:

selecting an additional training instance including an additional training instance of vision data and one or more additional training annotations, where each additional training annotation in the one or more additional training annotations identifies an additional ground truth location of an additional corresponding object location of an additional object, in the additional training instance of vision data;

processing the additional training instance of vision data using the feature extraction network portion of the OLN to generate an additional set of training instance features;

processing the additional set of training instance features using the region proposal portion of the OLN to generate an additional set of proposed object locations in the additional training instance of vision data;

processing the additional set of proposed object locations using the region based portion of the OLN to generate one or more additional predicted annotations, where each additional predicted annotation in the one or more additional predicted annotations identifies a corresponding predicted location of a corresponding additional object location in the additional training instance of vision data;

generating an additional loss based on comparing the one or more additional predicted annotations and the one or more additional training annotations of the additional training instance of vision data; and updating one or more additional portions of the OLN based on the generated additional loss.

3. The method of claim 1, wherein the feature extraction network portion of the OLN includes one or more feature pyramid connections, and wherein the set of training instance features include one or more feature maps.

4. The method of claim 1, further comprising:

receiving a given instance of vision data;

detecting one or more given objects in the given instance of vision data based on processing the given instance of vision data using the trained OLN.

5. The method of claim 4, wherein detecting the one or more given objects in the given instance of vision data based on processing the given instance of vision data using the trained OLN comprises:

processing the given instance of vision data using the feature extraction network portion of the OLN to generate a set of given instance features;

processing the set of given instance features using the region proposal portion of the OLN to generate a set of given proposed object locations in the given instance of vision data;

processing the set of given proposed object locations using the region based portion of the OLN to generate one or more given predicted annotations, where each given predicted annotation in the one or more given predicted annotations identifies a corresponding predicted location of a corresponding object location in the given instance of vision data; and generating the one or more given objects in the given instance of vision data based on the set of given proposed object locations and the one or more given predicted annotations.

6. The method of claim 1, wherein processing the set of proposed object locations using the region based portion of the OLN to generate the one or more predicted annotations, where each predicted annotation in the one or more predicted annotations identifies the corresponding predicted location of a corresponding object location in the training instance of vision data comprises:

processing the set of proposed object locations using a box refinement portion of the region based portion of the OLN to generate a set of refined candidate object locations in the training instance of vision data;

processing the set of proposed object locations using an intersection of union (IoU) portion of the region based portion of the OLN to generate an IoU score for each proposed object location in the set of proposed object locations, where the IoU score indicates an intersection of union between the corresponding proposed object location and a corresponding training annotation identifying the ground truth location of the corresponding object location of the object; and generating the one or more predicted annotations based on the set of refined candidate object locations and the corresponding IoU scores.

7. The method of claim 1, wherein the region based portion of the OLN is a region based convolutional neural network (R-CNN).

8. The method of claim 7, wherein the R-CNN is a faster R-CNN.

9. The method of claim 1, wherein each training annotation of the one or more training annotations includes a training bounding box identifying the corresponding object location of an object in the training instance of vision data.

10. The method of claim 1, wherein each predicted annotation of the one or more predicted annotations includes a predicted bounding box identifying the corresponding object location of a predicted object in the training instance of vision data.

11. A method implemented by one or more processors, the method comprising:

identifying an instance of vision data including one or more objects;

detecting the one or more objects in the instance of vision data, wherein detecting the one or more objects comprises:

processing the instance of vision data using an Object Localization Network (OLN) to generate one or more predicted annotations, where each predicted annotation in the one or more predicted annotations identifies a corresponding predicted location of a corresponding object, of the one or more objects in the instance of vision data, wherein processing the instance of vision data using the OLN to generate the one or more predicted annotations comprises:

processing the instance of vision data using a box refinement portion of the OLN to generate a set of proposed object locations in the instance of vision data;

for each proposed object location in the set of proposed object locations, processing the proposed object location using a centerness portion of the OLN to generate a centerness score corresponding to the proposed object location and indicating a predicted deviation of the proposed object location from a ground truth representation of the location of the object;

selecting a subset of proposed object locations from the set of proposed object locations based on the corresponding centerness scores;

processing the subset of the proposed object locations using an additional box refinement portion of the OLN to generate a set of refined object locations;

for each refined object location in the set of refined object locations, processing the refined object location using an intersection of union (IoU) portion of the OLN to generate a corresponding IoU score indicating a predicted intersection of union between the refined object location and the ground truth representation of the object;

ranking the set of refined object locations, where the rank of each refined object location, in the set of refined object locations, is based on the corresponding centerness score and the corresponding IoU score; and detecting the one or more objects based on the ranking of the set of refined object locations.

12. The method of claim 11, wherein at least one of the one or more objects detected in the instance of vision data are captured in one or more training instances used to train the OLN.

13. The method of claim 11, wherein at least one of the one or more objects detected in the instance of vision data were not captured in one or more training instances used to train the OLN.

\* \* \* \* \*